United States Patent Office 3,303,036
Patented Feb. 7, 1967

3,303,036
CERAMIC COMPOSITION
Leon B. Coffin, Andover, N.Y., assignor to United States Borax & Chemical Corporation, Los Angeles, Calif., a corporation of Nevada
No Drawing. Filed June 6, 1962, Ser. No. 200,343
8 Claims. (Cl. 106—73)

This invention relates to the art of making ceramic bodies and in particular to unfired bodies having improved green strength.

In the usual methods of making ceramic articles, such as tile, brick, block, dies, etc., a body material or bisque is formed by casting, molding or pressing. The formed bisque must then be carefully transferred to a dryer and then subsequently fired or vitrified.

The unfired bisque has substantially no green strength and is easily broken after pressing or molding or while being moved to the dryer. This problem becomes especially pronounced in the manufacture of large bodies such as clay block and clay panels.

Typical of the prior art methods used to give set strength or green strength to an unfired ceramic body is the addition of ethyl silicate in alcohol to the mix before the body is formed. The use of ethyl silicate in alcohol is an extremely costly technique and additionally it is an extremely hazardous process since it involves the necessity of flashing off the alcohol. Because of these factors the use of ethyl silicate in alcohol is not looked upon favorably by those in the ceramic industry.

It is, therefore, the principal object of this invention to provide a method of producing unfired ceramic bodies having high set strength or green strength.

A further object is to provide a composition by the use of which ceramic bodies may be safely and economically produced.

A still further object of this invention is to provide a composition, the use of which imparts to ceramic bodies physical properties not obtained by prior art compositions.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a ceramic composition having high green strength, comprising an intimate admixture of a clay-containing ceramic body composition, from about 2% to about 12% based on the weight of said body composition of sodium borate and from about 2% to about 15% based on the weight of said body composition of sodium silicate.

From the foregoing broadly stated paragraph it will be seen that the present invention comprises any clay-containing composition in admixture with a sodium borate and sodium silicate. There are innumerable clay-containing compositions used for a multitude of purposes. These compositions are immaterial to the present invention, the crux of the present invention being that when both sodium borate and sodium silicate are added to a clay-containing ceramic composition, the resultant composition has a green or unfired strength never obtained before by the prior art.

For example, in a light-weight clay building panel made by a molding process, I use 75 parts of light-weight aggregate, 25 parts of clay shale, 0.5 part of magnesium oxide, and 3 parts of anhydrous sodium borate. To 70 parts of this dry mix is added 30 parts of a 12% solution of sodium silicate in water. The entire mass is thoroughly admixed and then placed in a mold on a vibrating table. The blending, vibrating in the mold, and release from the mold was accomplished in about 15 minutes. The resultant unfired or green body was uniformly solid and was easily handled without breakage. Heretofore it required 2–3 days to dry the body before it could be released from the mold. It must be clearly understood that this remarkable set strength cannot be obtained by the addition of either the sodium borate or sodium silicate alone, but both ingredients must be present in the final composition.

It is again emphasized that the addition of the sodium borate and sodium silicate to any clay-containing ceramic composition will result in a body having high set strength.

While both the sodium borate and sodium silicate are necessary to obtain high set strength in an unfired body, the addition of from about 2% to 12% of sodium borate with or without the sodium silicate will result in a fired body having a phenomenal increase in modulus of rupture and cold crushing strength. In addition, a clay-containing ceramic composition additionally containing from about 2% to 12% sodium borate can be fired at temperatures up to 500° F. lower than bodies which do not contain the sodium borate and the normal firing cycle can be decreased from 24 hours to about 6 hours.

To demonstrate the effectiveness of the addition of sodium borate to a clay-containing ceramic composition, the following data is given: A base mix was prepared which comprised 75% light-weight aggregate, 25% clay shale and 0.5% magnesium oxide. To equal portions of the base mix was added 2%, 4%, 6%, 8% and 10% of "Rasorite 65" ("Rasorite 65" is a glassy granular anhydrous borax, manufactured by United States Borax & Chemical Corporation). The dry batches were then dry blended for about 10 minutes. The dry batches were thoroughly mixed with equal volumes of water and then poured and tamped into molds which were being vibrated. The vibration was continued for about 5 minutes, the bodies were allowed to "set" and were then removed from the molds. Thirty 1″ x 1″ x 6″ bars and fifteen 2¼″ x 2¼″ x 2″ blocks were made containing only the base mix. The same number of bars and blocks were made for each additional mix containing 2%, 4%, 6%, 8% and 10%, respectively, of the sodium borate. Six bars for modulus of rupture test and three blocks for cold crushing strength test from each mix were fired to five different pyrometric cones: cone 015 (1418° F.), cone 011 (1607° F.), cone 09 (1706° F.), cone 05 (1886° F.) and cone 02 (2003° F.).

After firing, the bars and blocks were measured, broken and crushed on a Tinius Olsen testing machine. The average modulus of rupture and cold crushing strength for each mix and firing are given in the following tables:

TABLE I
[Modulus of rupture (lbs./in.²)]

| | Cone 015 | Cone 011 | Cone 09 | Cone 05 | Cone 02 |
|---|---|---|---|---|---|
| Base Mix | 81 | 90 | 143 | 371 | 878 |
| Base Mix plus 2% "Rasorite 65" | 115 | 195 | 341 | 636 | 1,225 |
| Base Mix plus 4% "Rasorite 65" | 235 | 441 | 626 | 1,176 | 1,258 |
| Base Mix plus 6% "Rasorite 65" | 359 | 679 | 669 | 1,206 | Melt |
| Base Mix plus 8% "Rasorite 65" | 551 | 808 | 1,012 | 1,244 | Melt |
| Base Mix plus 10% "Rasorite 65" | 715 | 980 | 1,105 | Bloat | Melt |

TABLE II

[Cold crushing strength (lbs./in.²)]

|  | Cone 015 | Cone 011 | Cone 09 | Cone 05 | Cone 02 |
|---|---|---|---|---|---|
| Base Mix | 643 | 254 | 476 | 1,074 | 2,500 |
| Base Mix plus 2% "Rasorite 65" | 577 | 625 | 278 | 1,680 | 4,630 |
| Base Mix plus 4% "Rasorite 65" | 895 | 1,186 | 868 | 4,020 | 1,815 |
| Base Mix plus 6% "Rasorite 65" | 1,214 | 1,400 | 1,332 | 5,230 | Melt |
| Base Mix plus 8% "Rasorite 65" | 1,622 | 1,692 | 2,690 | Bloat | Melt |
| Base Mix plus 10% "Rasorite 65" | 3,110 | 3,470 | 4,420 | Bloat | Melt |

The foregoing tables show that the sodium borate has a significant effect on the clay-containing ceramic composition. The addition of the sodium borate increases the modulus of rupture very rapidly with increasing percentages of the same. A 2% addition of sodium borate lowers the firing temperature 50° F. while a 10% addition of sodium borate lowers the firing temperature over 400° F. The cold crushing strengths confirm the fact that the maximum strength that can be attained by the body is increased by the addition of sodium borate, and the cold crushing strengths additionally confirm the fact that the firing temperature is lowered by the sodium borate. Also the results in Tables I and II show a very significant increase in the firing range of the body. This is dramatically illusrtated by the fact that the bodies with 8%–10% sodium borate start developing high strength at the lower firing temperatures. This is a very desirable property in commercial firing since the firing program will not need to be controlled as closely when an 8%–10% addition of sodium borate is present.

While the foregoing tests were all run on the same ceramic body, this was done in order to graphically illustrate the effectiveness of sodium borate plus sodium silicate or sodium borate alone with controlled variables, and thus eliminate the possibility of other materials introducing factors which could be said would influence the results. The addition of sodium borate and sodium silicate to any clay-containing ceramic composition will result in bodies having green strength never before attained and the addition of 2% to 12% sodium borate to any clay-containing ceramic composition will result in increased strength of the fired body plus shorter firing times.

Other modes of applying the principle of the invention may be employed, change being made as regards the details described, provided the features stated in any of the following claims or the equivalent of such be employed.

I, therefore, particularly point out and distinctly claim as my invention:

1. A ceramic composition having high green strength and a high modulus of rupture and a high cold crushing strength when fired, consisting essentially of an admixture of lightweight aggregate, clay, from about 2% to about 12% based on the total weight of said clay and aggregate of sodium borate, and from about 2% to about 15% based on the total weight of said clay and aggregate of sodium silicate.

2. The composition of claim 1 wherein the combination of aggregate and clay consists essentially of, by weight, about 75% light-weight aggregate and about 25% clay.

3. The method of producing a ceramic composition having high green strength and high modulus of rupture and high cold crushing strength when fired, which comprises admixing a clay-containing ceramic body composition with from about 2% to about 12% based on the weight of said body composition of sodium borate, then adding from about 2% to about 15% based on the weight of said body composition of an aqueous solution of sodium silicate and thoroughly admixing said ingredients, said clay-containing ceramic body composition comprising light-weight aggregate and clay.

4. The method of claim 3 wherein said body composition comprises, by weight, about 75% light-weight aggregate and about 25% clay.

5. A ceramic composition according to claim 1 in which said sodium borate is anhydrous borax.

6. The method according to claim 3 in which said sodium borate is anhydrous borax.

7. The method of increasing the green strength of an unfired ceramic body composition of clay and light-weight aggregate which comprises admixing with said ceramic body composition from about 2% to about 12%, by weight, of anhydrous borax, and from about 2% to about 15%, by weight, of sodium silicate.

8. The method of claim 7 wherein said ceramic body composition comprises, by weight, about 75% light-weight aggregate and about 25% clay.

References Cited by the Examiner

UNITED STATES PATENTS 2,970,061   1/1961   Burnett _____ 106—71

FOREIGN PATENTS 302,519   12/1928   Great Britain.

HELEN M. McCARTHY, *Acting Primary Examiner.*

TOBIAS E. LEVOW, *Examiner.*

J. E. POER, *Assistant Examiner.*